Aug. 19, 1924.　　　　　　　　　　　　　　　　　　1,505,249
A. FELTON ET AL
RECUPERATOR FOR FURNACES
Filed Feb. 8, 1922　　　　5 Sheets-Sheet 1
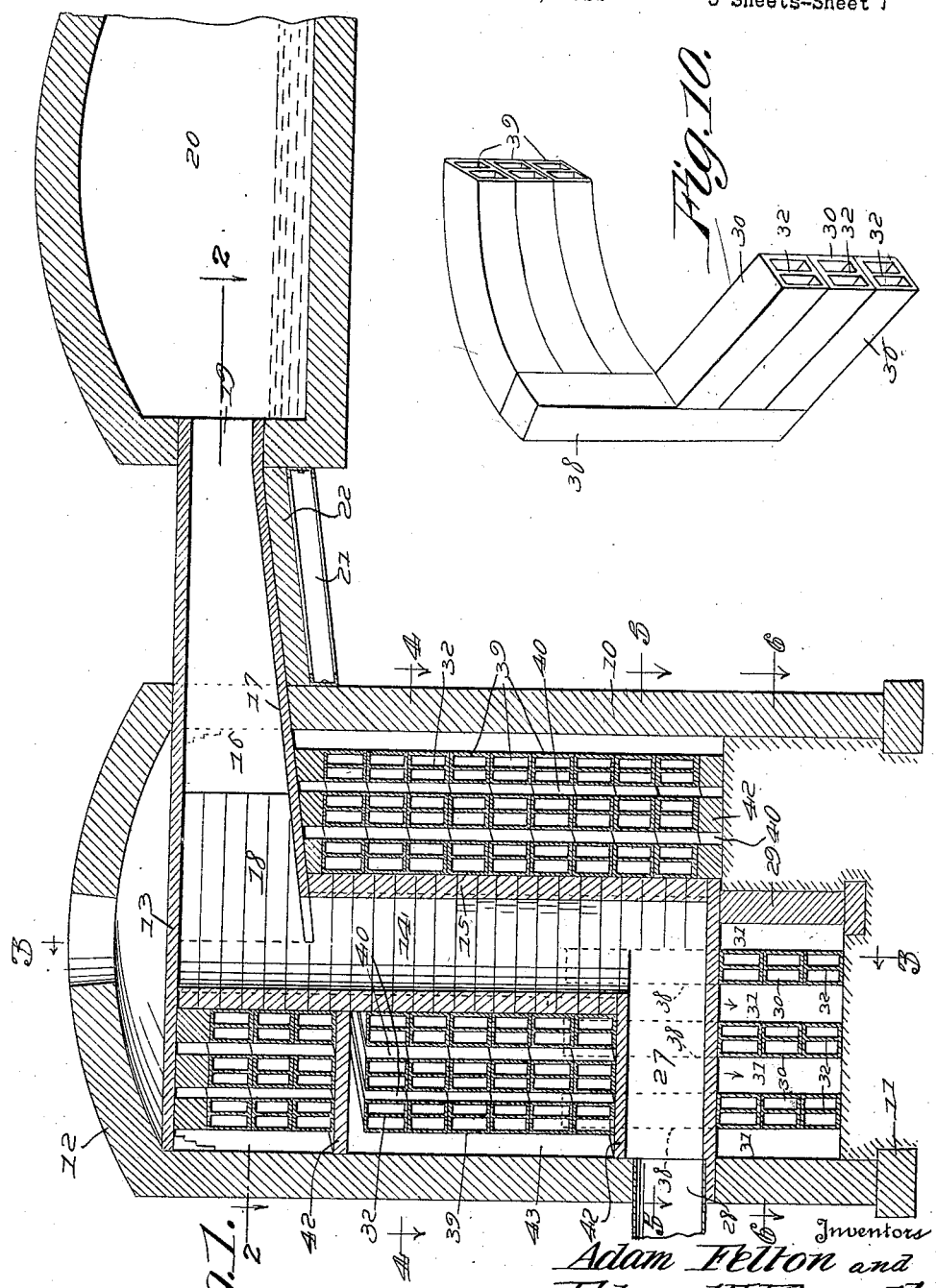
Inventors
Adam Felton and
Edward H. Klemroth,
By Watson E. Coleman,
Attorney

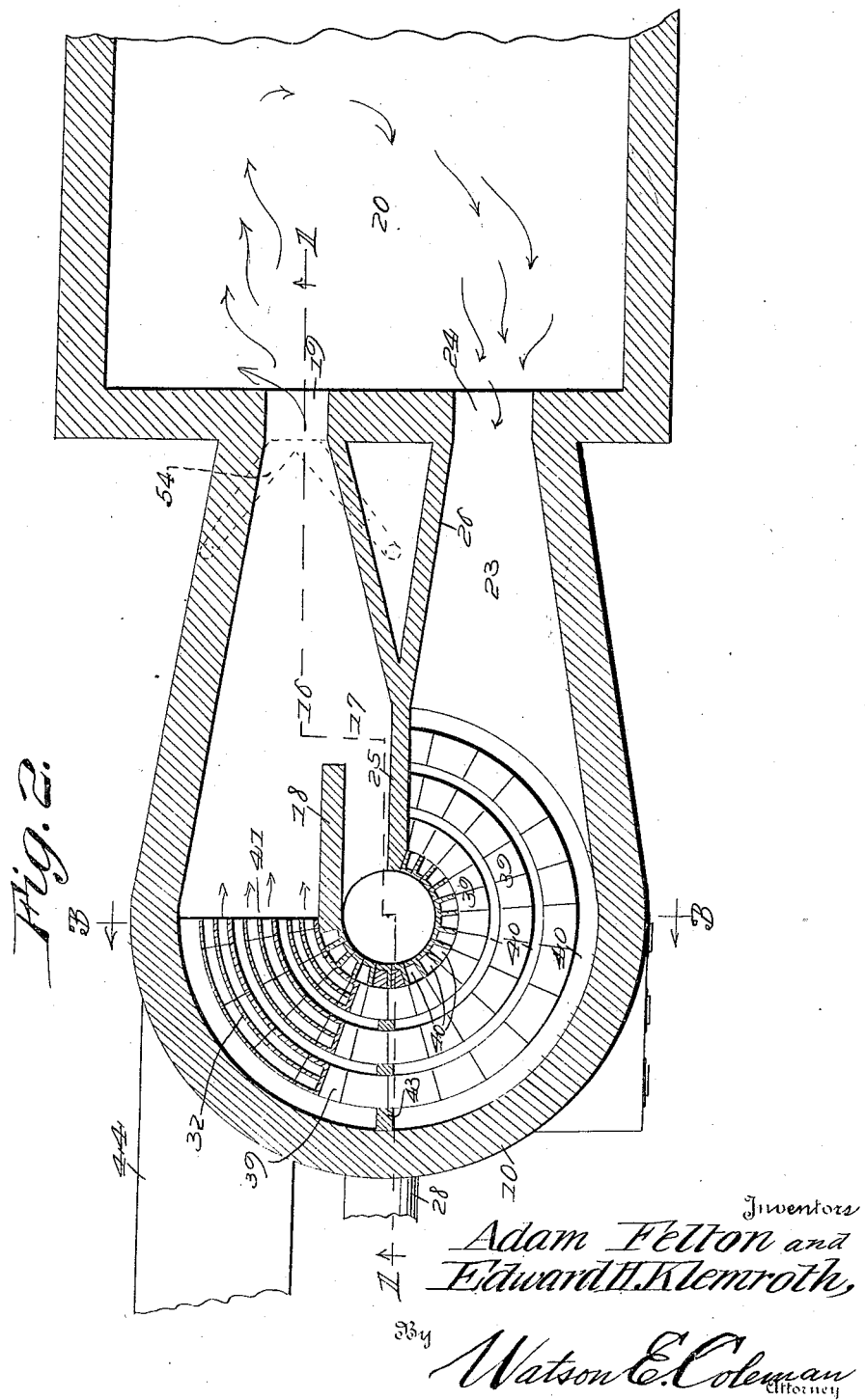

Aug. 19, 1924.
A. FELTON ET AL
1,505,249
RECUPERATOR FOR FURNACES
Filed Feb. 8, 1922
5 Sheets-Sheet 3
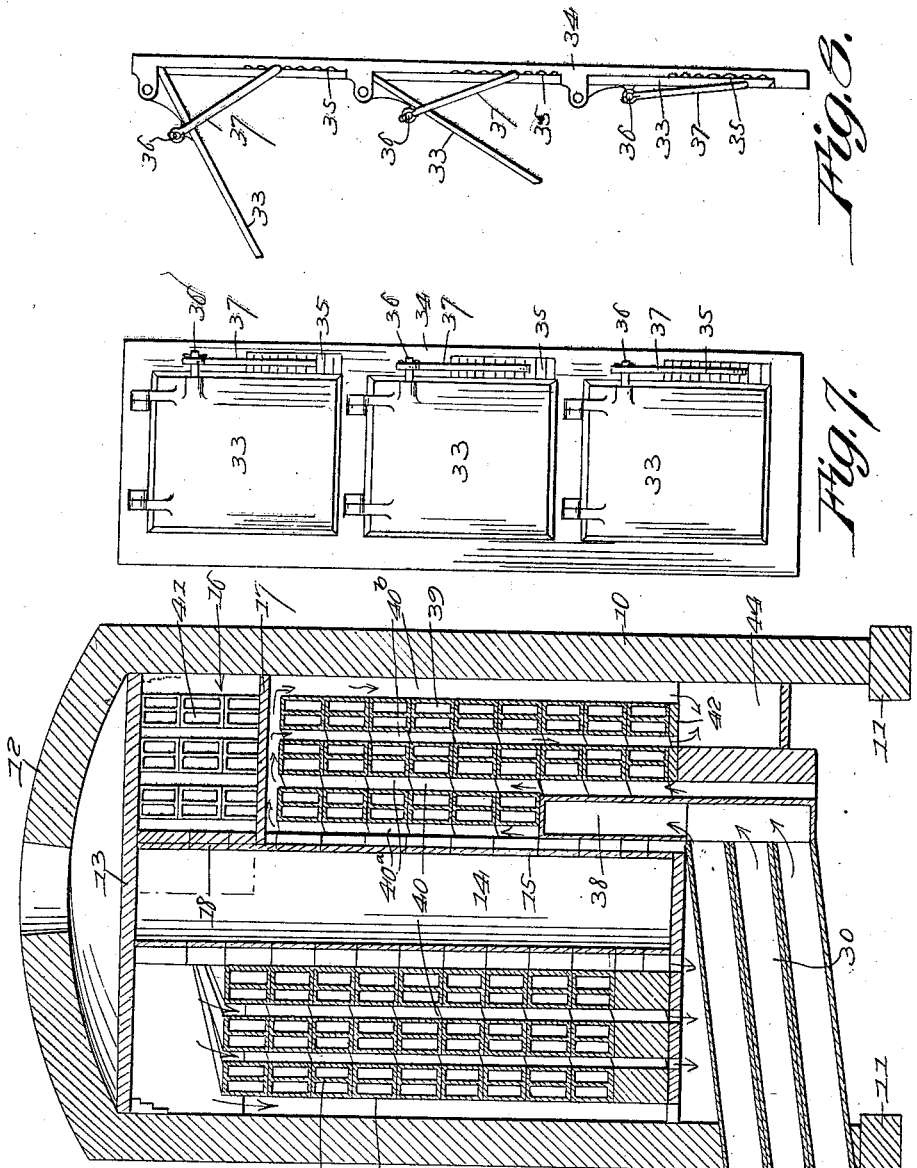

Aug. 19, 1924. 1,505,249
A. FELTON ET AL
RECUPERATOR FOR FURNACES
Filed Feb. 8, 1922  5 Sheets-Sheet 4
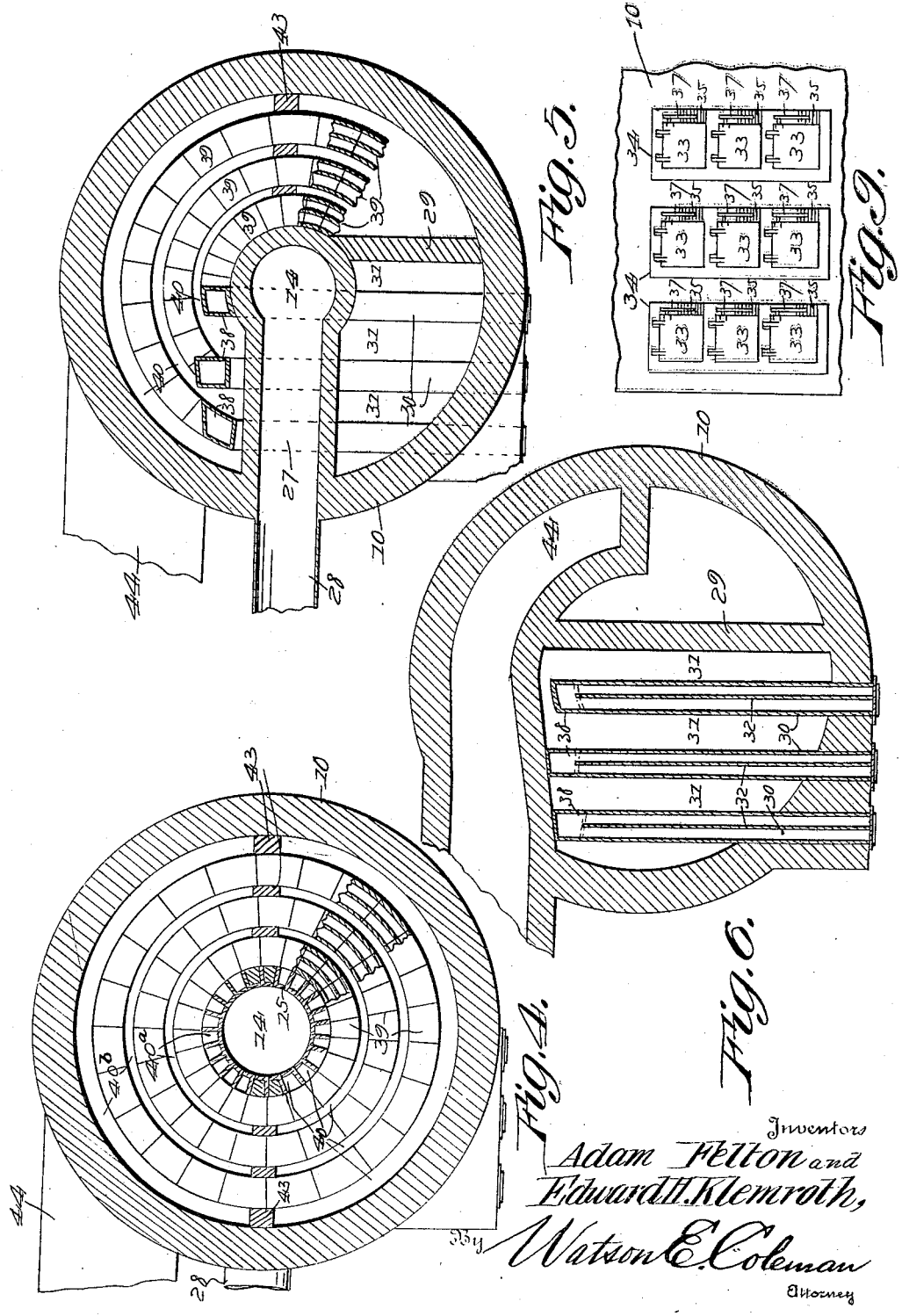

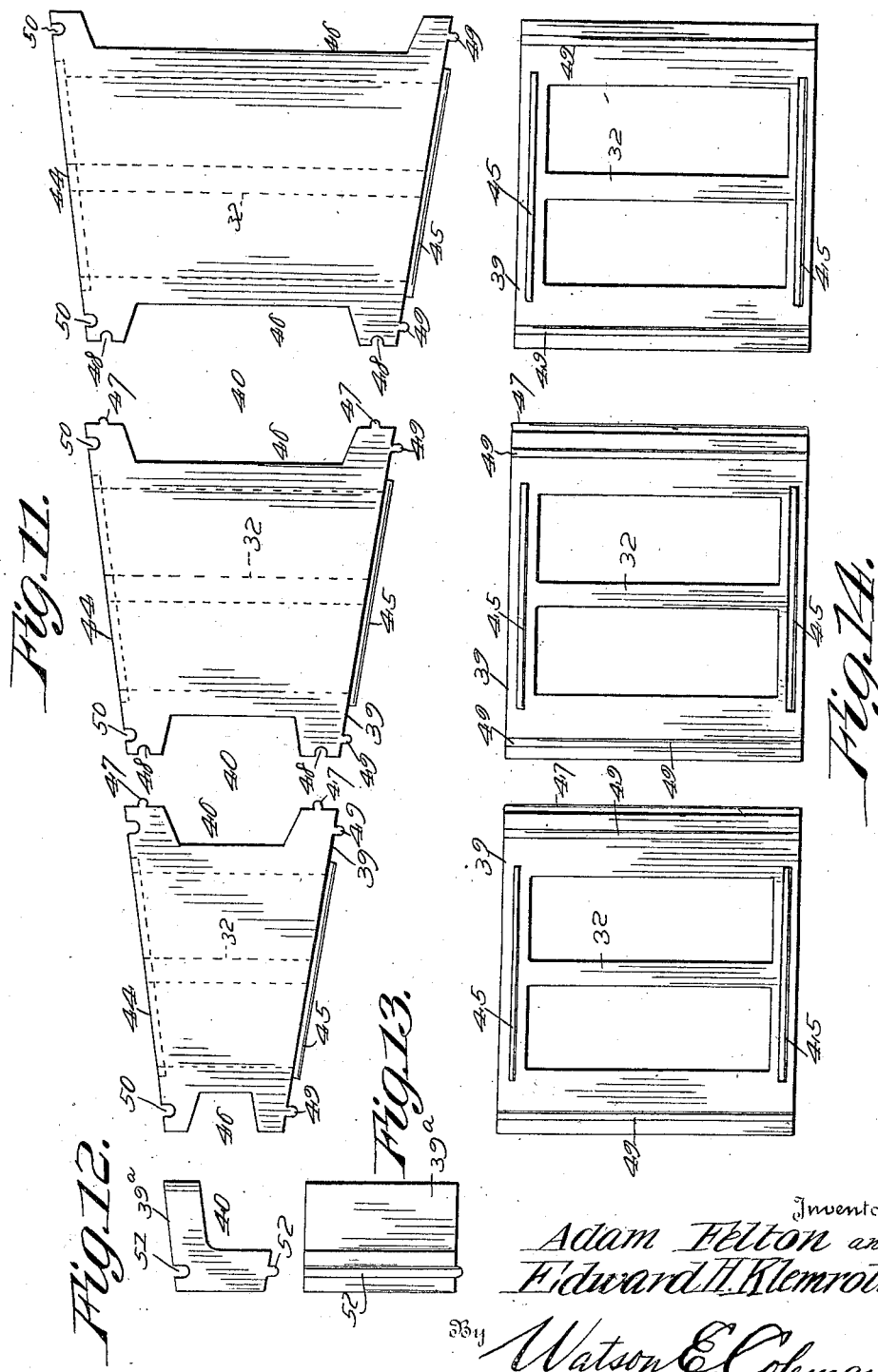

Patented Aug. 19, 1924.

1,505,249

UNITED STATES PATENT OFFICE.

ADAM FELTON AND EDWARD H. KLEMROTH, OF MUNCIE, INDIANA.

RECUPERATOR FOR FURNACES.

Application filed February 8, 1922. Serial No. 534,976.

*To all whom it may concern:*

Be it known that we, ADAM FELTON and EDWARD H. KLEMROTH, citizens of the United States, residing at Muncie, in the county of Delaware and State of Indiana, have invented certain new and useful Improvements in Recuperators for Furnaces, of which the following is a specification, reference being had to the accompanying drawings.

This invention relates to recuperators or regenerators used in connection with furnaces for the purpose of abstracting the heat from an escaping volume of combustion products and imparting this heat to an incoming volume of air and gas, the invention relating particularly to the construction and arrangement of the gas passage, the fresh air ducts, and the waste heat ducts.

One of the objects of this invention is to provide a regenerator or recuperator wherein no checkers are used and wherein there is no necessity of reversing the gas or air, but in which the waste products flow continuously through the proper flues or passageways therefor and in one direction and there is a continuous flow of gas and air in the opposite direction through the proper ducts therefor.

A further object is to so utilize the otherwise wasted heat of the combustion products as to impart sufficient heat to the gas or oil to produce proper combustion, and further to provide a sufficient amount of fresh air to secure perfect combustion.

A still further object is to cause the heated gas or oil and air to acquire its greatest heat at the point of leaving the recuperator and entering the furnace, this extreme heat being secured from the waste heat at the instant that the waste heat or products of combustion leave the pot or furnace or other melting device, the outgoing combustion products leaving the pot or melting device coming directly in contact with the air flue at the point of combustion.

Still a further object is to cause the waste gases or combustion products to pass downward in a direction reverse to the upward passage of the gas and air, so that the temperature of the fresh air and gas will be continuously increased by reason of the fact the fresh air and gas flow toward the point where the waste gases or combustion products are the hottest.

Another object is to provide a central gas passage or duct and a plurality of helical fresh air passages winding around the gas duct, the fresh air passages having inlet ports at their lower ends and discharging at their upper ends into the combustion chamber, the central gas passage also discharging at its upper end into the combustion chamber.

A further object in this connection is to provide a plurality of fresh air ducts arranged in a plurality of sets, all of the fresh air ducts extending in a helix around the central gas passage and one set of fresh air ducts being separated from the other set of fresh air ducts by heating ducts through which the waste products of combustion from the furnace pass, these heating ducts being so designed as to carry the waste gases or products of combustion downward past the air ducts and beneath the entrance ducts thereto, then upward to a point immediately beneath the combustion chamber, and then again downward and out through the stack so as to utilize every particle of waste heat in heating the incoming air and gas.

Still another object is to provide inclined fresh air tiled passages leading to and discharging into the helical air passages so as to reduce friction as much as possible, the fresh air being heated by the waste heat in these inclined passages and naturally flows upward. Thus no draft is needed to draw the waste gases into the recuperator.

A further object is to so construct the air passages as to eliminate abrupt or angular turns and thus insure a steady flow of the heated fresh air.

A still further object is to form the fresh air ducts or passages of tile having a medial partition traversing the tile, this partition eliminating the cold air center in the air current and further making for stability of construction.

Another object is to provide very simple means whereby the inlet of fresh air to the fresh air passages may be controlled, which comprises an intake door for each of the fresh air passages, each door being hinged independently so that it can be adjusted to admit just the proper amount of fresh air to each helix, which will take up the heat from the waste gases, this door further controlling the proportion of fresh air to unburned gas.

Other objects will appear in the course of the following description.

Our invention is illustrated in the accompanying drawings, wherein:—
Figure 1 is a vertical section on the line 1—1 of Figure 2;

Figure 2 is a plan section on the line 2—2 of Figure 1;

Figure 3 is a vertical section on the line 3—3 of Figure 2;

Figure 4 is a transverse section on the line 4—4 of Figure 1;

Figure 5 is a section on the line 5—5 of Figure 1;
Figure 6 is a section on the line 6—6 of Figure 1;

Figure 7 is a front elevation of one of the door casings for a unit of three air inlet tiles;
Figure 8 is a side elevation of the construction shown in Figure 7;

Figure 9 is a face view of the door casings for the three units of air inlet flues;

Figure 10 is a diagrammatic perspective view showing the air entrance tiles 30, the upright tile 38, and a fragmentary view of the three air flues of one series extending helically from the tile 38;

Figure 11 is a top plan view of a set of three air flue tiles, the tiles being separated from each other;

Figure 12 is a top plan view of one tile of the innermost set of air flue tiles;

Figure 13 is a face view of the tile shown in Figure 12;

Figure 14 is a face view of the three air flue tiles shown in Figure 10;

Referring to these drawings, it will be seen that this regenerator or recuperator comprises an outer, circular shell or casing, designated 10, of any suitable thickness and character but, of course, made of insulating brick or like building material. This wall 10 is supported upon a suitable foundation 11, is closed by a shallow dome 12, and below this dome there is disposed a horizontal wall 13 of paver stones or like material. Extending upward through the axis of the circular wall 10 is a circular gas passage 14 defined by a wall 15 which may be made of hollow tile. This gas passage at its upper end opens into a combustion chamber 16, the floor 17 of this combustion chamber being upwardly inclined and preferably being of three-inch stone slabs. This combustion chamber has a width equal approximately to one-half of the diameter of the circular wall 10 and where the gas passage 14 opens into the combustion chamber there is a wall 18 which is tangential to the wall of the gas passage and extends some distance into the combustion chamber. This combustion chamber 16, as illustrated in Figure 2, tapers or is contracted from its mouth 19 and this mouth 19 forms a port leading into the pot or furnace 20, which pot or furnace is shown diagrammatically and illustrated as a pot or melting device for melting glass, though it may be of any suitable character. This pot 20 is illustrated as spaced from the wall 10 and the combustion chamber 16 extends across this space and this combustion chamber is supported by supporting beams 21 and slabs 22. It will be understood, of course, that these details are non-essential and may be varied in many ways.

Disposed side by side with the combustion chamber 16 is a waste heat receiving chamber 23 communicating by a port 24 with the interior of the fire pot and being on the same level as the chamber 16 and separated therefrom by a partition or dividing wall 25 (see Fig. 2), this wall extending outward from the wall 15 of the gas duct 14 and being divided into two walls beyond the wall 10, as at 26. Thus the waste heat chamber 23 is contracted toward the port 24 just as the combustion chamber 16 is contracted toward the port 19. It will be noted here that the gases entering the pot from the combustion chamber circulate around the pot and then pass out through port 24 into the waste heat chamber 23 and from thence they pass down through the regenerator or recuperator, as will be later stated.

It will be noted from Figure 1 that the lower end of the gas duct or passage 14 terminates above the lower end of the circular wall 10 and that this gas passage then extends radially outward, as at 27, and is connected to the gas main 28 leading from a producer plant or from any other suitable source of gas. Below the bottom of the gas passage 14 and extending tangentially with respect to the center of the gas passage is a wall 29 which terminates at its lower end short of the lower end of the wall 10, this wall constituting a baffle. Extending parallel to this wall 29 and in the space below the bottom of the passage 27 and the vertical gas passage 14 are disposed a plurality of fresh air inlet flues, each designated 30. As illustrated in Figure 1, there are nine of these fresh air flues arranged in three vertical series, one series being spaced from the other by vertical waste heat flues 31 which are constituted by the space intervening between the fresh air flues and the baffle wall 29. Preferably these flues 30 are formed of tile and, as illustrated in Figure 1, are upwardly inclined from their entrance ends to a point beyond the central gas flue 14. Each fresh air entrance flue 30 is preferably formed of a tile which has a medial partition 32, and the entrance end of each fresh air entrance flue is provided with a hinged door 33 which is illustrated as hinged at its upper end and adapted to swing to a greater or less distance to admit fresh air into the fresh air flue.

As illustrated, the frame 34 of each door is provided upon one side with a series of ratchet teeth 35 and each door has pivoted to it upon the laterally projecting pintle 36 a pawl 37 which is adapted to engage the corresponding ratchet teeth 35 so as to hold the door open to a degree deemed necessary by the operator. Thus the admission of fresh air to each entrance flue 30 is controlled. Preferably a single door frame will be common to each vertical series of flues.

The three fresh air entrance flues or ducts 30 arranged in the same vertical series open into a vertical duct 38 of tile, the tile forming this duct 38 being set vertically, with the front wall of the tile removed. Thus each unit of three fresh air inlet tiles 30 discharges into one vertical flue, which in turn discharges the fresh air into a unit consisting of three vertically disposed, helical flues 39. As illustrated, there are nine of these entrance fresh air flues 30 arranged in units of three and there are nine helical flues 39, these flues being arranged in units of three vertical flues placed contiguous to each other and there being three sets of these vertical flues, these sets or series of vertical flues being separated from each other by spaces 40 which constitute waste heat flues. These three sets of helical flues extend around the central wall 15 of the central passage 14 in a uniformly rising helix and, as illustrated, these flues 39 make three turns around the central gas flue before discharging at 41 into the combustion chamber 16 exteriorly of the tangential wall 18 thereof. These flues 39 are preferably formed of tile which is divided into two chambers by the medial partition 32 previously referred to as being present in the tile forming the entrance flues or ducts 30. The purpose of forming the entrance flues 30 and the helical flues 39 of tile divided by the medial partition 32 is to prevent any cold center in the air current, and further to secure stability in construction. We are not limited to the detailed construction or form of the tiles from which the flues 30 and the helical flues 39 are formed or to the particular construction of the regenerator walls and like parts because such details of construction may be varied in many ways. These series of helical ducts formed by tiles as described are supported upon a helical wall 42 or in any other suitable manner.

As before remarked, the three series of helical ducts or flues are spaced from each other by vertical passages 40 which extend from top to bottom of the regenerator; these passages 40 opening at their upper ends through the bottom or floor of the waste heat chamber 23, as illustrated in Figures 2 and 3, these passages at their upper ends at a point opposite the gas inlet to the combustion chamber being blanked by the blocks 43 or baffle walls. The heat, therefore, from the waste heat chamber 23 passes down the passages 40 on one-half of the regenerator, along the passages 31, beneath the floor of the gas passage 14, and laterally between the tiles, as illustrated by the arrows in Figure 3. Then the waste heat rises upward on the opposite side of the baffle walls 43 and through the two inner passages 40$^a$ to a point immediately beneath the discharging ends of the helical flues and beneath the combustion chamber, and then passes downward, as illustrated by the arrows in Figure 3, through the two outermost passages 40$^b$ and so to the passage 44 which leads to the stack and which extends tangentially from the regenerator 10 and parallel to the gas inlet passage 27. Preferably the tile or brick which constitutes the wall 15 is hollow and open on its outer face so as to constitute the inner waste heat passage 40, as illustrated in Figure 2, that is the passage which immediately surrounds the gas passage 14.

It will be seen that after burning, the products of combustion leave the pot or furnace through the passage or chamber 23, discharge downward through the space between the helical tile to the inclined spaces between the fresh air entrance tile 30, pass under the gas flue or passage 27, and rise on the opposite side of the recuperator and pass upward until they strike the bottom of the combustion port or chamber where they act to heat the bottom of the chamber and then pass downward through the two outside spaces on this side of the recuperator to the bottom of the recuperator, where they enter the stack flue. The producer gas or any other suitable gas enters the recuperator through the passage 27 and rises through the circular gas flue 14 to the top of the recuperator and then passes into the combustion chamber where it mixes with the heated air entering through the helical flues. This gas traveling upward through the circular, centrally disposed flue 14 is heated by the waste heat from the pot or furnace and this waste heat from the pot or furnace also thoroughly heats the fresh air passing through the helical flues. Thus no checkers are required, as is customary in regenerators now burning producer gas. Furthermore, no reversing of the current of gas and air or of the current of products of combustion is necessary.

It is to be noted that the mixture of heated gas and air acquires its greatest heat at the point of leaving the recuperator and at the point of combustion acquiring this extreme heat from the waste heat at the instant the waste heat leaves the pot or furnace or other melting device, and furthermore that the waste heat at its highest temperature, that is at the instant of leaving the pot or furnace, comes directly in contact with the air flue at the point of combustion. Thus the fresh air as it moves upward in the series of helical flues meets the current of waste heat and thus the temperature of the fresh air is continuously increased as it passes upward by flowing toward the point where the waste heat is the hottest. With this construction there is a constant current of fresh air and gas moving in one direction toward the point of combustion and a constant current of products of combustion moving from the point of combustion in a direction reverse to that of the fresh air and gas and toward the point of final discharge so that the products of combustion are discharged with a minimum of retained heat and all the heat units, therefore, which are present in the products of combustion or waste heat are utilized. Inasmuch as the air flues extend around the central gas chamber, it follows that the air has a free and natural flow upward to the point of discharge into the combustion chamber and there are no abrupt turns or angles which would tend in any way to impede this natural draft or flow of air through these helical air flues.

In Figures 13 to 14 we have illustrated the specific character of the tile used to form the helical air flues. Figure 11 shows a top plan view of three of these tiles and shows that the tiles forming the air flues are gradually reduced in length toward the center of the furnace. Each of these tiles has the longitudinally extending passage intersected by the transverse partition 32 and one end face of each tile is formed with the projecting tongues 44 and the other face with the recesses 45 designed to receive these tongues. The ends of each tile are formed to provide recesses 46 and when the tiles are brought together these recesses 46 together constitute flues or channels 40 through which the waste products of combustion pass. The walls on each side of each recess 46 are formed with tongues 47 and on the opposite end with the corresponding grooves 48 to receive these tongues and the end faces of each tile are formed on one face with vertical tongues 49 and on the other face with vertical grooves 50 to receive the tongues 49 of adjacent tiles. The innermost tile 39ª of the series of tiles forming the wall 15 of gas flue 14 is angular in form, as illustrated in Figure 12, and is provided on one face with the groove 51 and on the other end face with the tongue 52 adapted to be inserted in the groove 51 of an adjacent tile. It will be seen that these helix tiles (Figure 11) have their ends convergent toward the center of the regenerator so that they conform to the radial lines of the regenerator or recuperator, and further it will be seen that the construction of the helix tile is such that double seal joints are provided eliminating any possible leak from waste heat to the fresh air, or vice versa.

It will be also understood that in Figures 1 to 9 we have illustrated the construction of the recuperator diagrammatically and have not attempted to illustrate in these views the detailed arrangement of the tile from which the air flues are built.

We have illustrated in dotted lines in Figure 2 means whereby oil or gas may be supplied to the port 19 in case producer gas is not used, this means including the converging burner pipes 54.

We claim:—

1. A recuperator of the character described having helical air flues, and means for directing products of combustion around said air flues in a direction reverse to the direction of movement of the air in said flues.

2. A recuperator of the character described having a gas passage, helical air flues spaced from each other, and means for directing products of combustion around said air flues and the gas passage in a direction reverse to the flow of gas and air.

3. A recuperator of the character described having a cumbustion chamber and a waste heat chamber disposed contiguous to the combustion chamber, a gas passage opening into the combustion chamber, a plurality of helical air flues extending around the gas passage and opening into the combustion chamber, and means for directing the heated products of combustion from the waste heat chamber around the air flues and the gas passage in a direction reverse to the direction of flow of the air and gas.

4. A recuperator having a centrally disposed gas passage, a combustion chamber into which the gas passage opens, a plurality of helical air flues arranged in radial series and extending around the gas passage and upward, the gas passage and air flues discharging into the combustion chamber, the spaces between said series of air flues and the gas passage constituting passages for the heated products of combustion.

5. A recuperator and a fire pot or furnace coacting therewith, the recuperator having a combustion chamber at its upper end discharging into the fire pot and having a chamber at its upper end for receiving hot products of combustion from the fire pot, a centrally disposed gas passage extending upward through the recuperator and discharging into the combustion chamber, and a plurality of air flues arranged in radial series and extending helically around the gas passage and discharging into the combustion chamber, and a discharge passage into which the spaces between the air flues and the recuperator wall discharge.

6. A recuperator and a fire pot or furnace coacting therewith, the recuperator having a combustion chamber at its upper end discharging into the fire pot and having a chamber at its upper end for receiving hot products of combustion from the fire pot, a centrally disposed gas passage extending upward through the recuperator and discharging into the combustion chamber, and a plurality of air flues arranged in radial series and extending helically around the gas passage and discharging into the combustion chamber, the spaces between said radial series of air flues and the central gas passage constituting flues for the products of combustion, said last named flues extending vertically downward through the recuperator and concentric to the central gas passage and having baffle walls causing the products of combustion to pass downward from said receiving chamber on one side of the recuperator, then upward to a point beneath the floor of the combustion chamber, and then downward beside the outermost series of air flues, the recuperator having a discharge passage into which said flues carrying products of combustion discharge.

7. A recuperator having an outer circular wall, a combustion chamber carried upon the upper end of the wall and having a width equal to approximately half of the recuperator, the combustion chamber being adapted to open into a fire pot, a waste heat receiving chamber disposed parallel to the combustion chamber and contiguous thereto and having a width approximately equal to half the diameter of the recuperator and adapted to receive products of combustion and waste heat from a fire pot, a central gas passage opening at its upper end into the combustion chamber and extending downward therefrom and then laterally to the exterior of the recuperator, a plurality of air flues arranged in a radial series and opening at their upper ends into the combustion chamber, said air flues extending helically downward and around the central gas passage to a point below the lower end of the gas passage and then opening to the exterior air, and being spaced from each other and from the outer wall and the wall of said gas passage, said spaces forming concentric flues for combustion products, said spaces being divided by vertical baffle walls extending diametrically with respect to the recuperator below the partition wall between the combustion chamber and the waste heat receiving chamber and across the recuperator to the opposite wall, said baffle walls extending downward to a point below the gas inlet whereby the products of combustion in the receiving chamber shall be directed downward and past the series of air flues and the adjacent walls of the gas passage and recuperator, thence upward on the opposite side of the recuperator to a point below the floor of the combustion chamber, and thence downward between the outermost helical flues and the walls of the recuperator to a point of discharge.

8. A recuperator of the character described having helical air flues and a combustion chamber at the upper end into which said air flues discharge, and means for directing products of combustion from said combustion chamber downward past said air flues in a direction reverse to the direction of movement of the air in said flues and parallel to the axial center around which the helix is described.

9. A recuperator of the character described having a combustion chamber and a waste heat chamber disposed contiguous to the combustion chamber, a central gas passage opening into the combustion chamber, a plurality of helical air flues extending around the gas passage and opening at their upper ends into the combustion chamber, and means for directing the heated products of combustion from the waste heat chamber downward past a certain portion of the air flues in a direction reverse to the direction of flow of the air and gas but parallel to the axis around which the helical flues are described, then upward past a certain other portion of the air flues to a point beneath the bottom of the combustion chamber, and then downward and out of the recuperator.

10. A recuperator of the character described having a combustion chamber and a central gas passage opening at its upper end into said combustion chamber, a waste heat chamber, a plurality of air flues communicating at their lower ends with fresh air extending helically around the gas passage and opening at their upper ends into the combustion chamber, said air flues being divided into a plurality of vertically arranged series spaced from the contiguous vertically arranged series of air flues to provide waste heat passages extending concentrically to the gas passage, and means for directing the heated products of combustion from the waste heat chamber downward through certain of said spaces and past that portion of the air flues disposed above the entrance portions thereof, then upward to a point beneath the combustion chamber, and then downward adjacent the exterior wall of the recuperator and outward.

11. In a recuperator, a combustion chamber, a plurality of helical air flues communicating with a source of fresh air at their lower ends and at their upper ends discharging into the combustion chamber, a fire pot into which the combustion chamber opens, and means for heating the air in said flues by the waste heat from said fire pot.

12. In a recuperator, a plurality of air flues and means at the entrance of each air flue for controlling the amount of fresh air admitted into said flue, each controlling means being independent of any other controlling means.

13. In a recuperator, a combustion chamber, a series of air flues leading upward through said recuperator and discharging into the combustion chamber, and means at the inlet end of each air flue for controlling the amount of air passing therethrough consisting of a door frame, a door hinged thereto, the door frame having ratchet teeth and the door being provided with a pawl adapted to engage the ratchet teeth.

14. In a recuperator, a plurality of transverse series of fresh air flues, each series consisting of a plurality of vertically superimposed flues, and means for controlling the admission of air to said flues consisting of a plurality of frames each common to a vertical series of flues, and a plurality of doors hingedly mounted on each frame and each controlling the passage of air through one of said flues, each door having means whereby it may be adjusted.

15. In a recuperator, a circular outer wall, a central gas passage, a combustion chamber, a waste heat chamber, a fire pot into which the combustion chamber discharges and which in turn discharges into the waste heat chamber, a radial series of air flues, each series consisting of a plurality of vertically superimposed flues, said flues extending helically around the central gas passage and discharging into the combustion chamber, and a series of inclined air inlet flues communicating with the lower ends of the helical flues and extending to the exterior of the recuperator wall, each air inlet flue having means at its entrance end whereby the passage of air thereinto may be controlled.

16. In a recuperator having a circular outer wall and a central gas inlet flue, a radial series of helical air flues, each series consisting of a plurality of abutting tiles, the end faces of each tile being convergent inward, the end faces thereby conforming to radii drawn from the central axis of the recuperator.

17. In a recuperator having a circular outer wall and a central flue, a radial series of helical air flues, each series consisting of a plurality of abutting tiles, the end faces of each tile being convergent inward and the tiles being progressively shorter in proportion to their distance from the central axis of the recuperator, the abutting end faces of the tiles of one series having tongued and grooved surfaces.

18. In a recuperator having a circular outer wall and a central flue, a radial series of helical air flues, each series consisting of a plurality of abutting tiles, the end faces of each tile being convergent inward and the tiles being progressively shorter in proportion to their distance from the central axis of the recuperator, the abutting end faces of the tiles of one series having tongued and grooved surfaces, the side faces of the tiles being recessed at the middle of the tiles whereby to form a series of vertically extending flues between the radial space of tiles.

19. In a recuperator having a circular outer wall and a central flue, a radial series of helical air flues, each series consisting of a plurality of abutting tiles, the end faces of each tile being convergent inward and the tiles being progresively shorter in proportion to their distance from the central axis of the recuperator, the abutting end faces of the tiles of one series having tongued and grooved surfaces, the side faces of the tiles being recessed at the middle of the tiles whereby to form a series of vertically extending flues between the radial space of tiles, the abutting surfaces of the side faces of the tiles having coacting tongues and grooves at the margins of the side faces of the tiles.

20. A tile for building helical fresh air flues, the tile having convergent end faces and a central passage divided by a partition, the end faces of the tile being formed with tongues and grooves extending around the margin of the end face between the central aperture and the side faces of the tile, the opposite side faces of the tile being recessed and the outer faces of the walls of said recesses being formed with vertical grooves and vertical tongues.

In testimony whereof we hereunto affix our signatures.

ADAM FELTON.
EDWARD H. KLEMROTH.